Inventors:
Frank W. Van Luik, Jr.,
George F. Skala,
by Paul A. Frank
Their Attorney.

United States Patent Office 3,200,254
Patented Aug. 10, 1965

3,200,254
PHOTOSENSITIVE DETECTOR FOR AIRBORNE PARTICLES
Frank W. Van Luik, Jr., Schenectady, and George F. Skala, Scotia, N.Y., assignors to General Electric Company, a corporation of New York
Filed Mar. 19, 1962, Ser. No. 180,569
5 Claims. (Cl. 250—218)

Our invention relates to a method and apparatus for detecting fluorescent particles and, in particular, to a method and apparatus for effecting instantaneous and continuous low concentration measurements of fluorescent particles in a gaseous atmosphere.

The detection of tracer particles in a gaseous atmosphere finds application in continuous process controls and the field of meteorology, especially dealing with atmospheric pollution studies and air mass movements. Tracer particles are dispersed in the particular atmosphere under study and at predetermined locations and intervals of time, the atmosphere is sampled to discover the distribution of the tracer particles, thereby determining the characteristics of the atmospheric movement. A conventional technique for detecting air-borne tracer particles is to collect an air sample in a container device and then examine the contents under a microscope to determine the presence and number of tracer particles therein. This procedure is very time-consuming, the air samples being collected over periods of time which vary from a few seconds in areas close to the intial point of particle dispersal, to several hours at distant areas, thereby resulting in delayed measurements of any particles present. Since the conventional technique cannot obtain instantaneous and continuous measurements of the particles, it cannot be determined whether any particles are present in a given area until after an air sample collection and microscope analysis is made. Therefore, ti cannot be determined when to terminate the air sampling tests until the relatively long time interval of the last collection and subsequent microscope analysis reveals few or no particles.

Therefore, one of the principal objects of our invention is to develop a new method and an improved device for effecting instantaneous and continuous low concentration measurement of tracer particles in a gaseous atmosphere.

In its broadest aspect, our invention consists in continuously sampling an atmosphere containing tracer particles, irradiating the sample to effect fluorescence of any tracer particles therein and measuring the concentration of such fluorescent particles.

The features which we desire to protect herein are pointed out with particularity in the appended claims. The invention itself together with further objects and advantages thereof may best be understood by reference to the following description taken in connection with the accompanying drawing, wherein like parts in each of the several figures are identified by the same reference character, and wherein:

Figure 1:
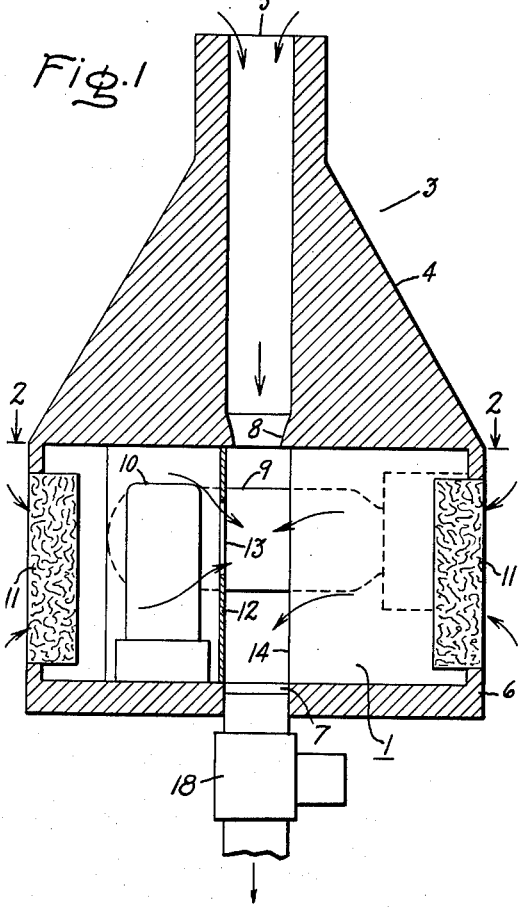
FIGURE 1 is a sectional elevation view of a dark chamber showing the position of an irradiating means and a measuring means therein.

Referring particularly to the device illustrated in FIGURE 1, there is shown an enclosed dark chamber designated as a whole by numeral 1, the chamber being defined and enclosed by a body 3 of suitable light-weight opaque material such as plastic. The upper part of body 3 comprises a funnel shaped member 4, adapted to introduce tracer particles into the device by means of a cylindrical hollowed out inlet passage 5 running vertically through member 4. Lower member 6 of body 3 provides the enclosure for dark chamber 1. Alternatively, the funnel shaped member 4 may be replaced by a relatively long tube 5 having opaque sides to provide the inlet means for the tracer particles and to decrease any ambient light within the device, and dark chamber 1 is enclosed by an opaque light-weight material such as aluminum. The tracer particles discharge through outlet means 7, comprising a hole in the base of lower member 6. A blower 18 is coupled to the outlet means and effects the flow of tracer particles through the device. The bottom end of inlet passage means 5 is provided with a nozzle shape 8 to form a narrow jet of tracer particles flowing through dark chamber 1 and outlet means 7.

Figure 2:
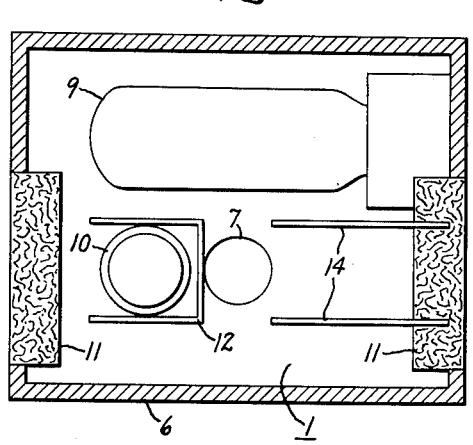
FIGURE 2 is a sectional plan view of the dark chamber taken on the plane of line 2—2 of FIGURE 1, showing the position of the irradiating means and measuring means.

The tracer particles which are dispersed into the atmosphere under study may conveniently be fluorescent powder such as U.S. Radium Fluorescent No. 2267 or its equivalent, which is manufactured by the United States Radium Corporation of Morristown, New Jersey. This powder is composed of zinc sulfide and cadmium sulfide, has a specific gravity of 4.2, an approximate particle size of 2.5 microns and the property of becoming fluorescent when exposed to 3650 angstrom wave length radiation, thereby glowing with a yellow color. The method and apparatus of our invention as applied to the detection of tracer particles in air masses is hereinafter described. An air sample containing the above described fluorescent particles is drawn into dark chamber 1 through inlet means 5 and nozzle 8, and within the dark chamber is exposed to radiation from a suitable irradiating means which may appropriately be an ultraviolet source 9, such as a BH4 mercury lamp emitting 3650 angstrom wave length radiation. The irradiation effects fluorescence of the fluorescent particles and they are detected by a detecting means such as photoemissive device 10 which may conveniently be a 931A photomultiplier tube. This tube produces an instantaneous output voltage signal for each fluorescent particle detected thereby. After the air sample passes through nozzle 8, it is mixed with clean air drawn into chamber 1 through fiberous air filters 11 that are positioned within opposing walls of lower member 6 on opposite sides of photomultiplier tube 10. The flow of clean air within dark chamber 1 prevents any of the tracer particles from becoming deposited on the photomultiplier tube or inner surfaces of dark chamber 1. The ultraviolet source 9 may conveniently be positioned at 90° to the photomultiplier tube 10 and air sample flow. An opaque shield 12, best illustrated in FIGURE 2, shields photomultiplier tube 10 from direct radiation by ultraviolet source 9. This shield also acts as a baffle to guide some of the clean air flowing through the air filter 11 located in the left side wall of member 6, around photomultiplier tube 10 and through a viewing hole 13 wherethrough tube 10 detects the fluorescent particles in the air sample flowing thereby. Baffles 14 positioned at the air filter 11 in the right side wall of member 6, direct a portion of clean air flow toward the air sample flowing through the dark chamber, thereby aiding to contain it within a small jet. Additional baffles may be utilized outside lower member 6 to shield dark chamber 1 from light that may enter through air filter 11.

Figure 3:
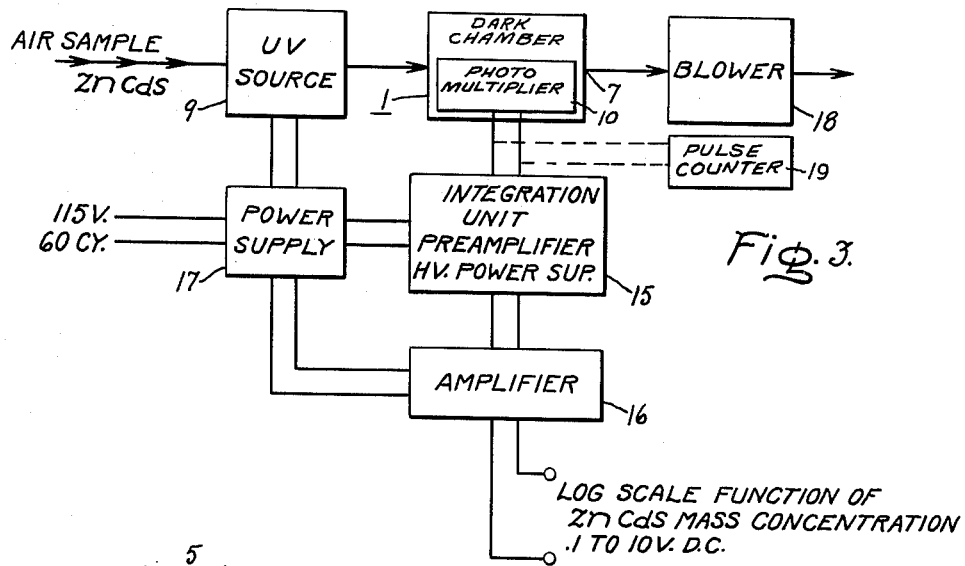
FIGURE 3 is a block diagram illustrating a fluorescent particle detector device wherein the irradiating means is located outside the dark chamber.

The output voltage signal from the photomultiplier tube is coupled to an electronic circuit located exterior to the dark chamber. The electronic circuit as disclosed in block diagram form in FIGURE 3 comprises a conventional integration unit to integrate the voltage signal with respect to time and a preamplifier 15 and amplifier circuit 16, thereby converting the photomultiplier output signal to a direct current voltage proportional to the logarithm of the mass concentration of fluorescent particles passing through the device as is well known in the electronic art and is exemplified in "Analytical Chemistry," volume 26, August 1954, pages 33–34-A. The mass concentration may conveniently be measured in units of micrograms per cubic centimeter of air sample. A low voltage power supply 17 supplies power to the ultraviolet source and integrator, preamplifier and amplifier circuits. It should be noted that ultraviolet source 9 is positioned outside dark chamber 1 in FIGURE 3, in contrast to its position within the dark chamber in FIGURE 1. A high voltage power supply supplies power to photomultiplier tube 10. Blower 18, not shown in FIGURE 1, is indicated in FIGURE 3 as discharging the air sample from outlet means 7 to the atmosphere. Alternatively, the electronic circuit may comprise a conventional pulse counter 19 which counts each fluorescent particle detected by the photomultiplier tube and provides an output measurement in units of fluorescent particles per cubic centimeter of air sample drawn through the device.

The sensitivity of the device may be increased by increasing the air sample flow rate passing through the device, employing a more intense irradiating means or a more sensitive photoemissive device, or by increasing the total area of air sample observed by the photoemissive device.

The subject fluorescent particle detector device may be made in a size enclosing a volume of approximately 2 cubic feet and having a weight of about 50 pounds. Inlet passage 5 may conveniently be a 6 inch long tube of 1 inch internal diameter, terminating in a ¾ inch nozzle end 8. A typical air sample flow through the device is 1 cubic foot per minute with an additional 1 cubic foot per minute of clean air entering through the air filters. The transient time of the tracer particles passing through the device is about 0.25 second and the response of the electronic circuit is about 0.5 second. Therefore, the device will respond in less than one second to fluorescent tracer particles detected therein. The device is capable of detecting from 1 to 200 fluorescent particles per cubic centimeter of air sample within a particle size range from 1 to 50 microns in diameter. The electronic circuit may be either a stabilized high voltage supply for the photomultiplier tube with dark current cancelling circuits to increase the sensitivity and a stabilized direct current amplifier to receive the low level light signal, or a feedback system holding the photomultiplier tube at a constant output by varying the high voltage supplied to the tube. The output of the electronic circuit may be read on a meter or reproduced on a recorder device.

The device herein described may be modified by changing the shape of member 4 or lower member 6 since the shape of these members is not critical to the performance of the device, the only structural requirement being that inlet means 5 be a relatively long opaque tube to reduce any ambient light within dark chamber 1. Ultraviolet source 9 need not be positioned within dark chamber 1 but may be located adjacent to the top of inlet means 5 as illustrated in FIGURE 3, thereby irradiating the tracer particles before they enter the device and eliminating the need for shielding photomultiplier tube 10 from ultraviolet source 9. Photoemissive device 10 may also be a conventional phototransistor or any other light sensitive device that provides an adequate output voltage as a signal to the electronic circuit. The particular irradiating means 9 and detecting means 10 utilized are dependent on the tracer particles employed since each particular type of tracer material is generally responsive to a particular wave length radiation and generally emits only a particular wave length of fluorescence. The device may also be modified to permit the simultaneous measurement of concentration of fluorescent tracer particles in two or more different atmospheres or air masses. The simultaneous measurement is desirable instead of separate measurements since in the case of air masses, the wind direction or velocity may change between measurements, thereby giving an erroneous indication of characteristics of the air masses under study. The different air masses may be segregated by dispersing tracer particles which fluoresce at one color in one of the air masses and different tracer particles that fluoresce at a different color in the other air mass when irradiated with a suitable radiation source. Two photoemissive devices, responsive to the two different colors of the fluorescent tracer particles are necessary in the modified device to detect two different air masses. Another means of studying two different air masses is to disperse tracer particles emitting the same color fluorescence but having different time lengths of persistency. In this case, a photoemissive device located near the irradiating source detects the tracer particles having short time persistence and a photoemissive device located further away from the irradiating source detects the tracer particles having long time persistence. Finally, one of the air masses may be dispersed with larger particles and the other air mass with smaller particles of the same tracer material and one of two photoemissive devices is made sensitive to the larger particles, thereby providing another means of separation of tracer materials and yet accomplishing simultaneous measurement of the concentration of the tracer particles. Three or more air masses can be simultaneously studied by extending the aforementioned methods or by combining several of them.

The method and apparatus heretofore described is not limited to the detection of tracer particles in air masses, but may be employed in many gaseous atmospheres such as industrial continuous process controls. In this latter application, a blower, long inlet means and clean air flow need not be utilized.

Having described a new method and an improved fluorescent particle detector device for effecting instantaneous and continuous low concentration measurements of fluorescent particles in accordance with my invention, it is believed obvious that other modifications and variations of the invention are possible in light of the above teachings. It is therefore to be understood that changes may be made in the particular embodiment of our invention described which are within the full intended scope of the invention as defined by the following claims.

What we claim as new and desire to secure by Letters Patent of the United States is:

1. An instrument for effecting instantaneous and continuous measurements of low concentration air-borne fluorescent particles comprising, an inlet passage comprising a long tube adapted for introducing an air sample flow of low concentration air-borne fluorescent particles into the instrument and for decreasing any ambient light within said instrument, an enclosed dark chamber, the lower portion of said long tube projecting into said dark chamber, irradiating means disposed adjacent the air sample flow and adapted to effect fluorescence of the particles, means disposed within said dark chamber and adjacent the flow of fluorescent particles for detecting the presence of said fluorescent particles, means coupled to the detecting means for instantaneously and continuously measuring the concentration of the fluorescent particles, air filter means disposed within opposing walls of said dark chamber on at least two sides of said detecting means to permit a flow of clean air into the dark chamber to prevent deposition of fluorescent particles on the detecting means and walls of the dark chamber, and a blower coupled to an outlet in the bottom of said instrument for effecting the air sample flow and clean air flow through said instrument and for exhausting both flows to the atmosphere.

2. The combination set forth in claim 1 wherein, said irradiating means comprises an ultraviolet source located within said dark chamber adjacent the lower portion of said long tube and positioned at 90° to the detecting means and the air sample flow, shielding means positioned between said irradiating means and detecting means to permit the detecting means to be responsive only to direct radiation emitted by the fluorescent particles, said detecting means comprises a photoemissive device, and means for adjusting the sensitivity of the instrument.

3. The combination set forth in claim 1 wherein, said irradiating means comprises an ultraviolet source located external to said dark chamber and adjacent the top of said long tube, said detecting means comprises a light-sensitive device, and means for adjusting the sensitivity of the instrument.

4. The combination set forth in claim 2 wherein, said ultraviolet source comprises a mercury lamp, said photoemissive device comprises a photomultiplier tube, and said measuring means comprises an electronic circuit including an integrator and amplifier for converting the output of said photomultiplier tube to a direct current voltage proportional to the logarithm of the mass concentration of fluorescent particles passing through the instrument, said instrument adapted to respond within one second to fluorescent particles having a minimum size of one micron in diameter and a minimum concentration of one particle per cubic centimeter of air sample.

5. The combination set forth in claim 3 wherein, said light-sensitive device comprises a phototransistor, and said measuring means comprises an electronic circuit including a pulse counter for converting the output of said phototransistor to the number of fluorescent particles per cubic centimeter of air sample passing through the instrument.

References Cited by the Examiner

UNITED STATES PATENTS

| | | | |
|---|---|---|---|
| 1,968,816 | 8/34 | Corbett et al. | 250—218 X |
| 2,301,401 | 11/42 | Hennessy et al. | 88—14 |
| 2,486,622 | 11/49 | White | 250—218 X |
| 2,632,114 | 3/53 | Silvertooth | 250—207 X |
| 2,966,092 | 12/60 | Hartridge | 88—14 |

RALPH G. NILSON, *Primary Examiner.*

WALTER STOLWEIN, *Examiner.*